No. 677,494. Patented July 2, 1901.
G. E. BARTHOLOMEW.
ROLLER BEARING.
(Application filed Dec. 13, 1900.)

(No Model.)

Witnesses:
F. F. Schurzinger
Henry L. Deck

Geo. E. Bartholomew, Inventor.
By Wilhelm Bonner
Attorneys.

UNITED STATES PATENT OFFICE.

GEORGE E. BARTHOLOMEW, OF BUFFALO, NEW YORK, ASSIGNOR OF ONE-HALF TO ALBERT A. ENGLE, OF SAME PLACE.

ROLLER-BEARING.

SPECIFICATION forming part of Letters Patent No. 677,494, dated July 2, 1901.

Application filed December 13, 1900. Serial No. 39,599. (No model.)

*To all whom it may concern:*

Be it known that I, GEORGE E. BARTHOLOMEW, a citizen of the United States, residing at Buffalo, in the county of Erie and State of New York, have invented new and useful Improvements in Roller-Bearings, of which the following is a specification.

This invention relates to a roller-bearing designed more particularly for the wheels of bicycles and other velocipedes; but the same is also desirable for the hubs of automobiles and similar vehicles.

The object of my invention is the provision of a durable and inexpensive bearing of this kind which comprises but few parts and which can be readily adjusted to take up any wear or looseness of the bearing members.

Figure 1:
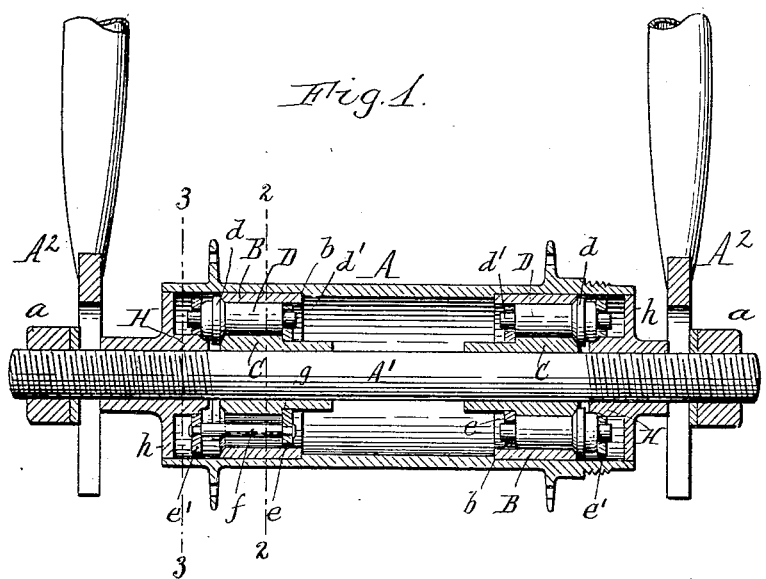
Figure 2:
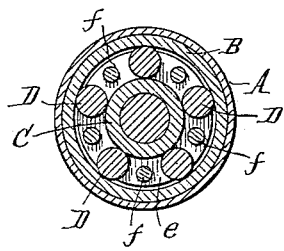
Figure 3:
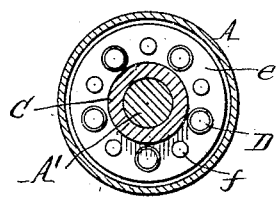
Figure 4:
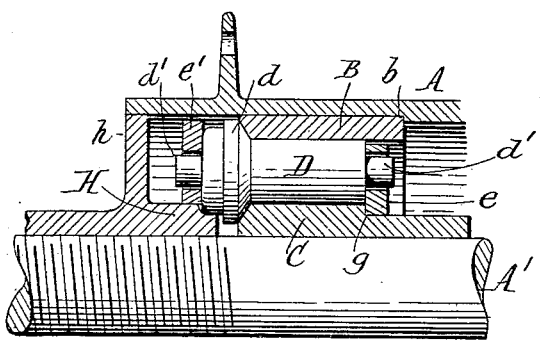

In the accompanying drawings, Figure 1 is a longitudinal section of the rear-wheel hub of a bicycle provided with my improved bearing. Figs. 2 and 3 are cross-sections in lines 2 2 and 3 3, Fig. 1. Fig. 4 is a fragmentary longitudinal section of the wheel-hub on an enlarged scale.

Like letters of reference refer to like parts in the several figures.

A is the casing of the bearing, which in the construction shown in the drawings consists of the body or barrel of a wheel-hub.

A' is the stationary axle, which is clamped in the slotted fork ends $A^2$ by the customary screw-nuts $a$, applied to the ends of the axle.

The wheel-hub is provided in each end with a roller-bearing, which comprises an outer bearing-ring B, arranged in the hub, an inner bearing ring or sleeve C, mounted on the axle concentrically with the outer ring B, and rollers D, interposed between said inner and outer bearing-rings. The outer bearing-rings abut at their inner ends against internal shoulders $b$ of the hub. Each roller D is provided near its outer end with an annular flange $d$, which bears against the outer end of the inner bearing-ring C and the shoulder formed by the adjacent end of the outer bearing-ring B, as shown in Fig. 1, so as to hold the roller against inward displacement lengthwise of the hub. The inner face of the flange $d$ is preferably beveled, and the adjacent ends of the inner and outer bearing-rings are correspondingly beveled, as shown. The rollers are provided at their ends with axial journals $d'$, which are loosely seated in openings formed in vertical separating-rings $e\ e'$, thereby holding the rollers of each bearing apart and properly spacing the same. The separating-rings of each bearing are rigidly tied together by longitudinal bolts or rivets $f$, arranged between the rollers. The inner ring C of each bearing is provided with a shoulder $g$, which abuts against the outer face of the inner separating-ring $e$ and which prevents inward displacement of said bearing-ring.

H H are bearing cones or collars, which receive the end thrust of the bearing and which are arranged on the axle at the outer ends of the rollers D. These cones are engaged with the axle by screw-threads, as shown, and one of them serves as the adjusting-cone of the bearings. The beveled faces of these cones bear against the outer peripheral ends of the rollers D and prevent outward displacement of the rollers lengthwise of the axle. The portions of the rollers which bear against the beveled faces of the cones H are preferably rounded slightly, as shown. The inner separating-ring $e$ of each bearing surrounds the reduced inner portion of the inner bearing-ring C, while the outer separating-ring $e'$ surrounds the cone H. The inner bearing-rings C are mounted loosely on the axle and are held against lateral or endwise displacement in an outward direction by the flanges $d$ of the rollers and in the opposite direction by the inner separating-rings $e$.

By arranging the cones H to bear only against the peripheral outer ends of the rollers D the friction between these parts is reduced to a minimum. Any lateral looseness of the bearings can be readily taken up by screwing one of the cones H farther into the end of the hub, the effect of this adjustment being to shift the rollers at the adjusting end of the hub inwardly until their flanges $d$ come in contact with the bearing-rings B and C, when the cone H at the opposite end of the hub is drawn against the adjacent rollers, and the latter are shifted inwardly until their flanges $d$ come in contact with the ends of the corresponding inner and outer bearing-rings. In thus taking up the end play of the bearings the beveled faces of the cones H have a tendency to move the rollers outward radially, thereby taking up any wear of the rollers and their bearing-rings. The journals of the rollers are fitted in the openings of the separating-rings $e\ e'$ with sufficient looseness for this purpose. The cones H are preferably provided with disks or flanges $h$, which fit snugly into the ends of the hub for excluding dust from the bearings.

The parts of my improved bearing can be easily assembled, and the simplicity of the bearing renders its cost comparatively small.

I claim as my invention—

1. The combination with an axle having bearing-rings mounted loosely thereon, of a casing surrounding the axle and provided at its ends, opposite said rings, with internal bearing-rings, means for preventing endwise movement of said loose axle-rings, a set of rollers interposed between the concentric bearing-rings at each end of the casing and each provided with an annular flange which bears against the outer end of the adjacent ring of the casing, and cones mounted on the axle at opposite ends of the casing and bearing with their beveled faces against the peripheral outer ends of said rollers, substantially as set forth.

2. The combination with an axle having bearing-rings mounted loosely thereon, of a casing surrounding the axle and provided at its ends, opposite said rings, with internal bearing-rings, a set of rollers interposed between the concentric bearing-rings at each end of the casing and each provided with an annular flange which bears against the outer end of the adjacent ring of the casing, a pair of connected vertical separating-rings for each set of rollers, surrounding the axle and provided with openings which receive journals arranged at the ends of the rollers, each of said inner bearing-rings having a shoulder which abuts against the outer face of the corresponding inner separating-ring, and cones mounted on the axle at opposite ends of the casing and bearing with their beveled faces against the peripheral outer ends of said rollers, substantially as set forth.

Witness my hand this 10th day of December, 1900.

GEORGE E. BARTHOLOMEW.

Witnesses:
ALBERT A. ENGLE,
CARL F. GEYER.